United States Patent
Ogle

(10) Patent No.: US 6,466,716 B1
(45) Date of Patent: Oct. 15, 2002

(54) OPTICAL FIBER HAVING A BRAGG GRATING IN A WRAP THAT RESISTS TEMPERATURE-INDUCED CHANGES IN LENGTH

(75) Inventor: Peter C. Ogle, Charlestown, RI (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/645,392

(22) Filed: Aug. 24, 2000

(51) Int. Cl.$^7$ ................................................. G02B 6/34
(52) U.S. Cl. ......................................................... 385/37
(58) Field of Search ............................... 385/37, 12, 13

(56) References Cited

U.S. PATENT DOCUMENTS

| | | | |
|---|---|---|---|
| 4,996,884 A | * 3/1991 | Lessing | 73/800 |
| 5,182,779 A | * 1/1993 | D'Agostino et al. | 385/13 |
| 5,399,854 A | * 3/1995 | Dunphy et al. | 250/227.17 |
| 5,426,714 A | 6/1995 | Gadkaree et al. | 385/39 |
| 5,633,965 A | * 5/1997 | Bricheno et al. | 385/37 |
| 5,993,934 A | * 11/1999 | Reese et al. | 428/113 |
| 6,004,639 A | * 12/1999 | Quigley et al. | 428/36.3 |
| 6,191,414 B1 | 2/2001 | Ogle et al. | 250/227.14 |

FOREIGN PATENT DOCUMENTS

WO      WO9957590      11/1999

\* cited by examiner

*Primary Examiner*—Rodney Bovernick
*Assistant Examiner*—Mike Stahl
(74) *Attorney, Agent, or Firm*—Ware, Fressola, Van Der Sluys & Adolphson LLP

(57) ABSTRACT

An athermal packaging for a span of optical fiber having a Bragg grating to counteract a shift in the wavelength reflected light caused by a change in temperature of the span. The packaging is made from a resin system reinforced by a layer of contrahelically wound (and in some applications braided) reinforcing fibers and further reinforced by reinforcing fibers disposed substantially parallel to the axis of the span of the optical fiber. The reinforcing fibers are typically KEVLAR fibers. In some applications, a bulge is provided in the optical fiber on both sides of the span of the optical fiber having the Bragg grating and the athermal packaging is molded over at least a portion of both bulges as well as over the intervening span having the Bragg grating, thus creating mechanical interference against slippage of the athermal packaging during expansion of the optical fiber in response to an increase in temperature.

12 Claims, 3 Drawing Sheets

US 6,466,716 B1

OPTICAL FIBER HAVING A BRAGG GRATING IN A WRAP THAT RESISTS TEMPERATURE-INDUCED CHANGES IN LENGTH

FIELD OF THE INVENTION

The present invention pertains to the field of providing optical fibers having a Bragg grating. More particularly, the present invention pertains to a wrap (packaging) for such an optical fiber, a wrap that resists changes in the center wavelength of the Bragg grating in the optical fiber due to changes in temperature.

BACKGROUND OF THE INVENTION

The use of fiber Bragg grating (FBG) devices in sensing applications has driven the requirements for very accurate measurements to be made on the center wavelengths of these devices, often down to $10^{-12}$ meters. Various instruments today are able to provide highly accurate readings of FBGs, especially when the FBGs function in a reflective mode. However, when FBG-based sensors are used in an environment where the temperature can change from room temperature to up to 150° C. or higher, the spacing between the elements of the Bragg grating of the FBG device and the index of refraction of the fiber can change enough to cause unacceptable errors in the sensing application; the wavelength of light reflected by a fiber Bragg grating changes with temperature at a rate of approximately 10 pm/° C.

Such changes in the reflected wavelength can be compensated for by measuring the temperature seen by the FBG device and applying a correction to the measured wavelength. However, it is often more advantageous to strain the fiber as a function of temperature in such a way as to compensate for thermal expansion and changes in index of refraction. This is accomplished by wrapping the optical fiber in a so-called athermal packaging, a packaging that adheres to the optical fiber, is stiffer than the optical fiber so that the optical fiber follows the change in length of the packaging, and that changes sufficiently over the required temperature range that the center wavelength does not shift more than an acceptable amount because of changes in temperature. This requires that the athermal packaging have a coefficient of thermal expansion of approximately $-8 \times 10^{-6}/°C$.

Although FBG devices used in the telecommunications industry provide athermal packaging of use in temperature ranges encountered in the applications of that industry (typically from somewhat below 0° C. to 80° C.), there are applications where an FBG sensor sees temperature changes from room temperature or below to over 200° C. What is needed is an athermal wrapping that will prevent the center wavelength of Bragg grating of an optical fiber used in an FBG device from changing more than an acceptable amount for changes in temperature to up to at least 150° C., and in some cases to changes in temperature to up to 200° C.

SUMMARY OF THE INVENTION

Accordingly, the present invention provides an apparatus and corresponding method for counteracting the tendency for the wavelength of light reflected from a grating, such as a Bragg grating, inscribed in an optical fiber to shift in response to a change in temperature of the span of the optical fiber having the grating, the method including the steps of: providing the span of the optical fiber having the grating; and wrapping a resin system about the span of the optical fiber, reinforcing the wrapping with a layer of contrahelically wound reinforcing fibers and further reinforcing the wrapping with reinforcing fibers disposed substantially parallel to the axis of the span of the optical fiber.

In a further aspect of the invention, the contrahelically wound fibers are contrahelically wound at a polar angle of 45 degrees.

In another, further aspect of the invention, the contrahelically wound fibers are also braided.

In yet still another, further aspect of the invention, all of the reinforcing fibers are KEVLAR fibers or all of the fibers are graphite composite fibers.

In yet even still another, aspect of the invention, the span of the optical fiber is provided with a bulge on either side of the span in which the grating is inscribed and the athermal packaging is molded over at least a portion of both bulges as well as the intervening span, thus creating mechanical resistance to slippage of the athermal packaging during expansion of the optical fiber in response to an increase in temperature.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
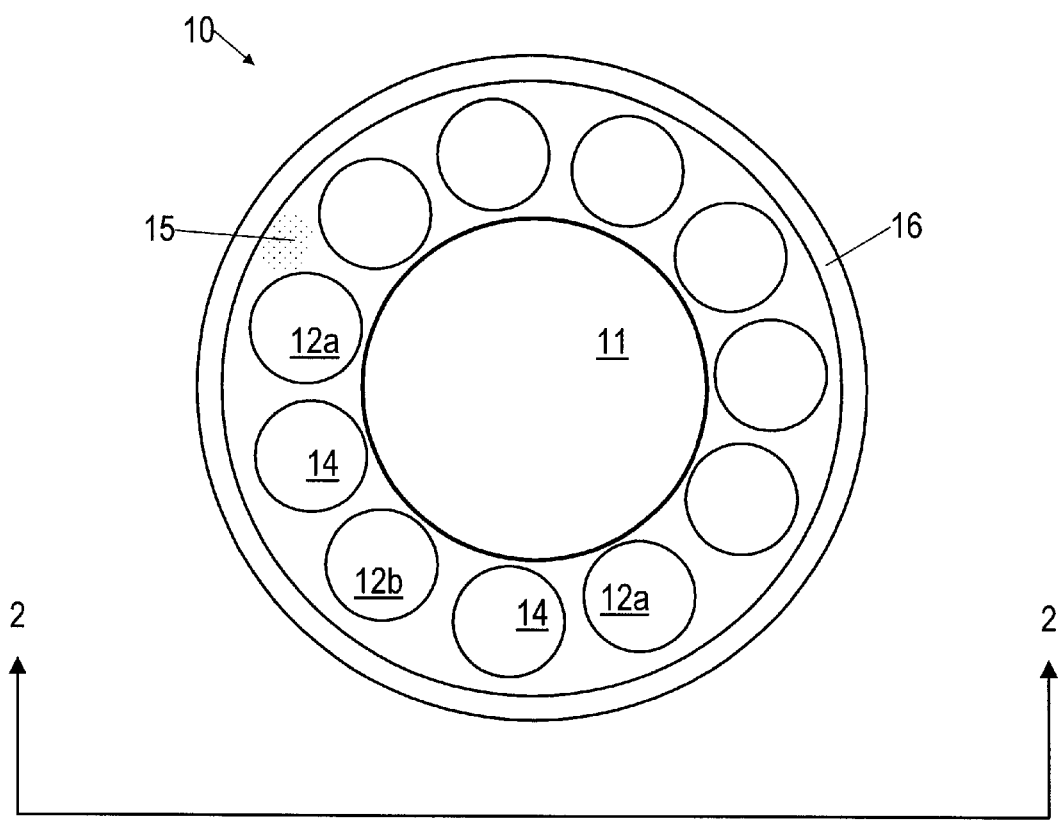
FIG. 1 is a schematic cross-sectional view of an athermal packaging, according to the present invention, encasing an optical fiber.
Figure 2:
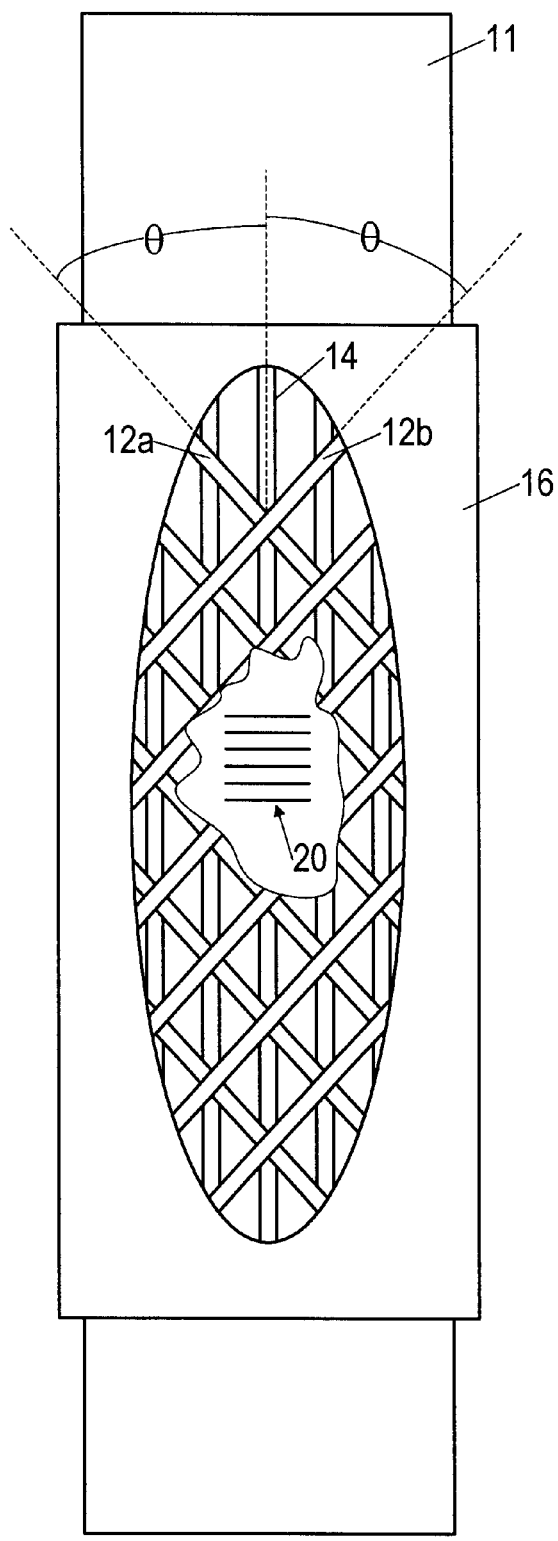
FIG. 2 is a lengthwise view of the athermal packaging of FIG. 1, showing contrahelically wound reinforcing fibers and longitudinally disposed reinforcing fibers in a resin, and showing the optical fiber of FIG. 1 partially encased by the athermal packaging.

Referring now to FIG. 1 and FIG. 2, to impose a negative coefficient of thermal expansion (CTE) on a Bragg grating 20 and thus prevent the center wavelength from changing more than a tolerable amount because of changes in temperature, an optical fiber 11 having the Bragg grating 20 is shown with the span including the Bragg grating wrapped by athermal packaging having a protective cover 16 of shrink tube. The athermal packaging encases a resin (polymer) 15 reinforced by contrahelically wound reinforcing fibers 12a 12b and longitudinally disposed reinforcing fibers 14. The contrahelically wound fibers 12a 12b consist of two sets of reinforcing fibers 12a 12b arranged to crisscross each other, with each set of reinforcing fibers 12a 12b making a polar angle θ with respect to the longitudinally disposed reinforcing fibers 14. The contrahelically wound fibers may be braided, i.e. interwoven so that the members in one set of reinforcing fibers cross over and then under the members of the other set of reinforcing fibers. In the preferred embodiment, the contrahelically wound fibers are braided; alternatively, one set of reinforcing fibers 12a is wound on top of the other set of reinforcing fibers 12b, as illustrated in FIG. 2.

The optical fiber span encased by the athermal packaging is bonded to the athermal packaging, and the athermal packaging is substantially stiffer than the optical fiber so that the optical fiber follows the athermal packaging in responding to thermally induced strains; i.e. if the athermal casing expands in length, so does the span of optical fiber encased by the athermal packing, and if the athermal casing contracts in length, so does the span of optical fiber encased by the athermal packing.

Figure 3:
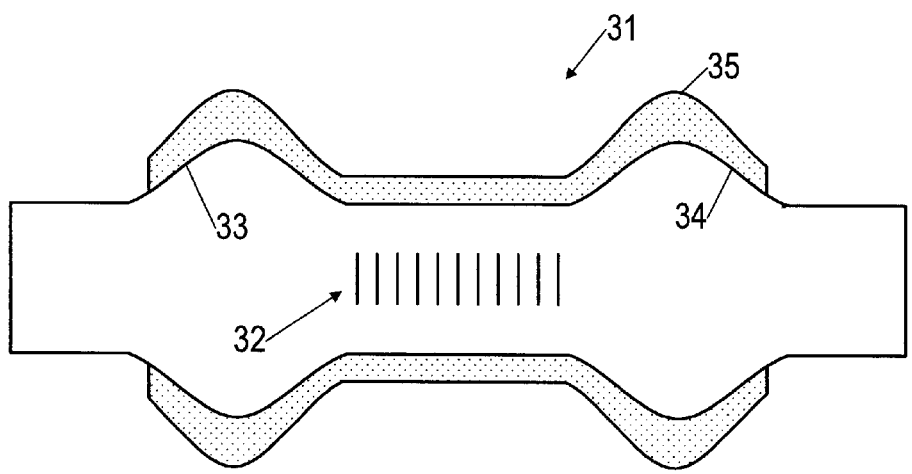
FIG. 3 is a lengthwise cross section of an optical fiber formed with a bulge on either side of the span in which a grating is inscribed.

Referring now to FIG. 3, in order to prevent failure of the bond of an athermal package to an optical fiber 31, and thus slippage of the athermal package over the optical fiber, it is desirable to supplement the bond with a bulge 33 34 in the optical fiber diameter on both sides of the optical fiber span in which the Bragg grating is inscribed, so as to provide mechanical resistance to slippage of the athermal packaging 35 over the optical fiber. The athermal packaging 35 is molded over at least a portion of both bulges 33 34 as well as over the intervening span. The optical fiber bulges are provided as disclosed in a co-owned (now abandoned) application entitled "Optical Fiber Bulge" having Ser. No. 09/073,700 and filed on May 6, 1998, which is hereby incorporated by reference.

The longitudinally disposed reinforcing fibers 14 and the contrahelically wound reinforcing fibers 12a 12b of the composite matrix cooperate to provide a structure with a negative CTE, a structure that can impose tensile and compressive strains when the span of optical fiber between the bulges sees a changing temperature. Such strains cause a shift in grating wavelength, counteracting the shift in grating wavelength that would occur with a change in temperature in the absence of the athermal package. In the preferred embodiment, the polar angle is approximately ±30 degrees.

In the preferred embodiment, the reinforcing fibers are made of KEVLAR, a commercially available product of E.I. du Pont de Nemours. The combination of reinforcing fibers and resin (called a composite material) used as the athermal packaging typically has a coefficient of thermal expansion of approximately $-4 \times 10^{-6}/°$ C. when the reinforcing fibers are KEVLAR and the contrahelically wound reinforcing fibers are provided at a polar angle of ±45 degrees. The small, negative coefficient of thermal expansion (CTE) of the athermal packing corresponds to a slight decrease in length of the athermal packaging and the encased optical fiber as temperature increases. For temperature changes from 0° C. and below to up to 150° C., the center wavelength of a Bragg grating encased in athermal packaging according to the present invention does not change more than a tolerable amount.

Another benefit of the athermal packaging of the present invention is that with the reinforcing fibers arranged as in the preferred embodiment so as to uniformly surround the optical fiber 11, a resistance to bending is imparted to the span of optical fiber within the athermal casing; bending of span of the optical fiber bearing the Bragg grating can affect the performance of the Bragg grating, and stiffness to bending is therefore advantageous.

KEVLAR has a temperature capability of up to at least 150° C. For applications requiring exposure to temperatures up to 200° C., instead of using KEVLAR reinforcing fibers, graphite composite fibers should be used. Graphite composite fibers will also result in a slight negative coefficient of thermal expansion of the athermal packaging. Alternatively, other organic fibers with negative CTE and higher temperature performance, such as PBO available from Dow Chemical, have been developed and are suitable for use in athermal packaging according to the present invention. With either KEVLAR or graphite reinforcing fibers, the athermal packaging contracts in length as the temperature increases to maintain the center wavelength of light reflected by a Bragg grating within the athermal packaging within tolerable limits.

To make the athermal packaging, the reinforcing fibers (either KEVLAR or some other material such as graphite) are either simply contrahelically wound or contrahelically wound and braided on typically 28 gauge plastic shrink tubing. The span of an optical fiber with a Bragg grating is then inserted into the tubing. The tubing is then removed and the contrahelically wound reinforcing fibers are inserted into a 22 gauge shrink tube. The shrink tube is then heated to cause it to shrink tightly around the reinforcing fibers. An ultraviolet curable resin is then injected into the shrink tube 16 and cured. The completed athermal packaging is typically approximately 1.5 mm in diameter, and typically approximately 50 mm long.

Figure 4:
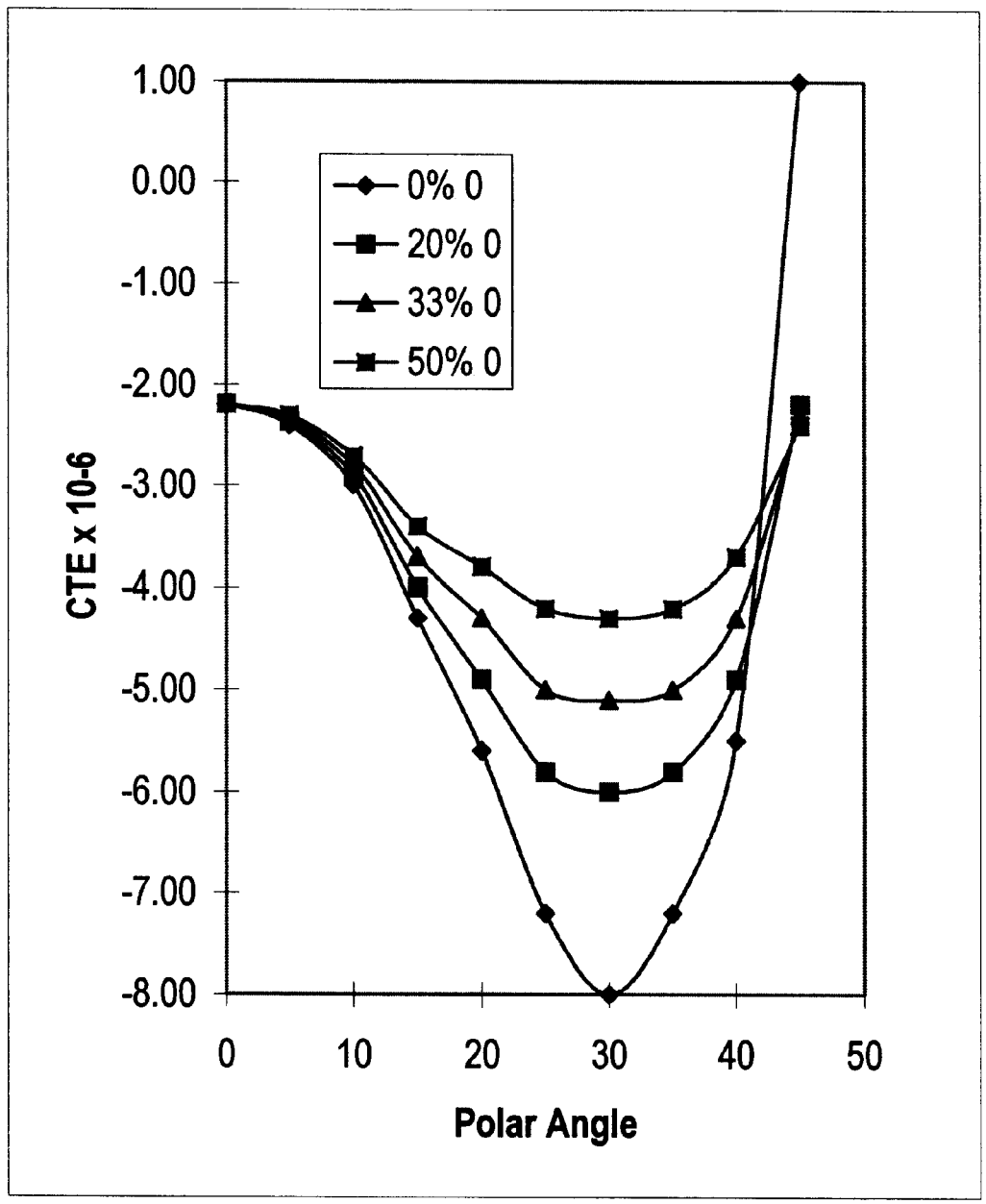
FIG. 4 is a graph of the coefficient of thermal expansion of an athermal packaging according to the present invention is shown as a function of the angle between the contrahelically wound fibers and the axial reinforcing fibers (at 0 degrees), for four different per cent compositions of axial reinforcing fibers (including the case of having no axial reinforcing fibers).

It is possible to tailor the coefficient of thermal expansion of the athermal packaging by adjusting the polar angle θ of the contrahelically wound fibers 12a 12b and the amount of longitudinally disposed fibers 14 used in making the composite material of the athermal packaging. Referring now to FIG. 4, a graph of the CTE of athermal packaging according to the present invention is shown as a function of the polar angle between the contrahelically wound fibers and the axial reinforcing fibers (at 0 degrees), for four different per cent compositions of axial reinforcing fibers (including the case of having no axial reinforcing fibers). The graph shows that the CTE is maximally negative at a polar angle of approximately 30 degrees (i.e. for an angle of 60 degrees between oppositely oriented contrahelically wound reinforcing fibers), regardless of the per cent composition of axial reinforcing fibers. The graph also shows that at the polar angle producing the maximally negative CTE, the CTE for an athermal packaging with 50% of the reinforcing fibers oriented axially (i.e. at 0 degrees) is approximately one half that of the CTE for an athermal packaging without any axial reinforcing fibers.

It is to be understood that the above-described arrangements are only illustrative of the application of the principles of the present invention. It is apparent that the athermal packaging of the present invention is of use in controlling the response of a span of optical fiber to changes in temperature, and in resisting bending of the optical fiber, regardless of whether the optical fiber span encased by the athermal packaging includes a Bragg grating or other kinds of grating (including for example a chirped grating). It can also be advantageous to employ the athermal packaging of the present invention in protecting a span of optical fiber when the span of optical fiber includes other optical characteristics besides a grating, or is even simply a bare optical fiber, as for example, in an application where a length of an optical fiber must be kept nearly constant. Numerous other modifications and alternative arrangements may be devised by those skilled in the art without departing from the spirit and scope of the present invention, and the appended claims are intended to cover such modifications and arrangements.

What is claimed is:

1. An apparatus comprising:

a) a span of an optical fiber having a grating; and b) an athermal packaging comprising a wrapping provided as a tubular element having a center bore with a center axis on which the span of optical fiber lies occupying substantially all of the center bore, wherein the tubular element comprises a resin system reinforced by a layer of contrahelically wound reinforcing fibers and further reinforced by reinforcing fibers disposed substantially parallel to the axis of the span of the optical fiber.

2. The apparatus of claim 1, wherein the contrahelically wound fibers are contrahelically wound at a polar angle of 45 degrees.

3. The apparatus of claim 1, wherein the contrahelically wound fibers are braided.

4. The apparatus of claim 1, wherein all of the reinforcing fibers are KEVLAR fibers.

5. The apparatus of claim 1, wherein all of the reinforcing fibers are graphite composite fibers.

6. The apparatus of claim 1, wherein a bulge is provided on both sides of the span of the optical fiber in which the grating is inscribed and the wrapping is molded over at least a portion of each bulge as well as the intervening span, thereby creating mechanical resistance to slippage of the athermal packaging during expansion of the optical fiber in response to an increase in temperature.

7. A method for counteracting the tendency for the wavelength of light reflected from a grating inscribed in an optical fiber to shift in response to a change in temperature of the span of the optical fiber having the grating, the method comprising the steps of:

a) providing the span of the optical fiber having the grating; and b) providing an athermal packaging comprising a wrapping provided as a tubular element having a center bore with a center axis on which the span of optical fiber lies occupying substantially all of the center bore, wherein the tubular element comprises a resin system reinforced with a layer of contrahelically wound reinforcing fibers and further reinforced with reinforcing fibers disposed substantially parallel to the axis of the span of the optical fiber.

8. The method of claim 7, wherein the contrahelically wound fibers are contrahelically wound at a polar angle of 45 degrees.

9. The method of claim 7, wherein the contrahelically wound fibers are braided.

10. The method of claim 7, wherein all of the reinforcing fibers are KEVLAR fibers.

11. The method of claim 7, wherein all of the reinforcing fibers are graphite composite fibers.

12. The method of claim 7, wherein a bulge is provided on both sides of the span of the optical fiber in which the grating is inscribed and the wrapping is molded over at least a portion of each bulge as well as the intervening span, thereby creating mechanical resistance to slippage of the athermal packaging during expansion of the optical fiber in response to an increase in temperature.

* * * * *

UNITED STATES PATENT AND TRADEMARK OFFICE
CERTIFICATE OF CORRECTION

PATENT NO.   : 6,466,716 B1
DATED        : October 15, 2002
INVENTOR(S)  : Peter C. Ogle It is certified that error appears in the above-identified patent and that said Letters Patent is hereby corrected as shown below:

Column 1,
Lines 45 and 46, "$-8\text{x}10^{-}{}_{6}/^{\circ}\text{C}$" should be -- $-8\text{x}10^{-6}/^{\circ}\text{C}$ --.

Signed and Sealed this

Eleventh Day of March, 2003

JAMES E. ROGAN
*Director of the United States Patent and Trademark Office*